United States Patent [19]

Rembaum et al.

[11] 3,910,819

[45] Oct. 7, 1975

[54] TREATMENT OF SURFACES TO STIMULATE BIOLOGICAL CELL ADHESION AND GROWTH

[75] Inventors: Alan Rembaum, Altadena; Marylou Ingram, La Canada; F. Agnes Stroud-Schmink, Pasadena; Donald E. Rounds, Altadena, all of Calif.

[73] Assignee: California Institute of Technology, Pasadena, Calif.

[22] Filed: Feb. 19, 1974

[21] Appl. No.: 443,751

[52] U.S. Cl. .................................. 195/1.7; 195/1.8
[51] Int. Cl.² ............................ C12B 3/00; C12B 9/00
[58] Field of Search ............................ 195/1.7, 1.8

[56] References Cited
UNITED STATES PATENTS
3,759,788   9/1973   Gajewski.......................... 195/1.8

*Primary Examiner*—Stanley J. Friedman
*Attorney, Agent, or Firm*—Marvin E. Jacobs

[57] ABSTRACT

Contact of negatively charged biological cells is promoted by dispersion within the cell medium of a minor amount of a polyquaternary polymeric amine known as an ionene. Adhesion of the cells to normally negatively charged surfaces such as glass or plastic tissue culture devices is stimulated by pretreating the surfaces of the devices with a dilute solution of the ionene polymer. Increased cell adhesion and growth is demonstrated for both normal and transformed cells. Experiments have verified that cells grow at a more rapid rate on the surface of an ionene treated container than in the most effective treated containers that are commercially available.

13 Claims, 3 Drawing Figures

TREATMENT OF SURFACES TO STIMULATE BIOLOGICAL CELL ADHESION AND GROWTH

ORIGIN OF THE INVENTION

The invention described herein was made in the performance of work under a NASA contract and is subject to the provisions of Section 305 of the National Aeronautics and Space Ace of 1958, Public Law 83-568 (72 Stat. 435; 42 USC 2457).

BACKGROUND OF THE INVENTION

1. Field of the Invention

The present invention relates to promotion of the growth of cultures of biological cells and, more particularly, to increased adhesion and growth of cells on treated surfaces of conventional tissue culturing devices.

2. Description of the Prior Art

The paramount importance of cell cultures is universally recognized. Growing of cells is necessary in the majority of biological investigations and in the diagnosis of diseases. Cell growth on plastic surfaces in the form of films or fibers may constitute a biological solution to the blood incompatibility problem. Active research is at present underway to provide a layer of cells between a fabric lining and circulated blood which coats the blood contacting surfaces of a circulatory prosthetic device. The devices used for tissue culturing such as Koch slides, flasks, plates, petri dishes and the like are usually manufactured from glass or plastic such as polystyrene. These surfaces do not exhibit sufficient adhesion to cells for the desired purpose. Cell adhesion to the surface is a necessary pre-condition for cell growth. A number of manufacturers of these devices indicate that they chemically treat the glass surfaces or irradiate the plastic surfaces with infrared radiation so as to promote cell growth. Polystyrene is a preferred material for these devices because it is transparent, inexpensive and easily disposable. Unfortunately, cells do not adhere well to this material even after radiation treatment and cell growth is often marginal or unsuccessful on these surfaces. Furthermore, the biological cell molecule comprises a negatively charged macromolecular protein. The ionic bond between the negatively charged protein and a much smaller monomeric positively charged unit attached to the surface may not provide a sufficiently strong ionic bond to maintain adhesion of the protein cell to the surface.

SUMMARY OF THE INVENTION

It has now been discovered that growth of biological cells is promoted by dispersion within the cell culture medium of a minor amount of a positively charged ionene polymeric polyelectrolyte. Adhesion, number of cells and rate of growth is increased on the surfaces of glass or plastic tissue culture devices by pretreating the surfaces with a dilute solution of the ionene polymer. These effects are demonstrated for both normal and transformed cells. A possible explanation for the stimulation effects of the ionene treatments is a change in electrical surface properties of the devices. A residual mono-layer of ionene imparts a positive charge to the normally negatively charged glass or plastic surface. The increased adhesion of negatively charged membranes is therefore due to electrostatic interaction between negative and positive charges. The cooperative effect of a relatively high molecular weight polymer of high charge density results in a considerably stronger ionic bond with negatively charged proteins or glass surfaces than a similar bond between monomeric compounds. Since cell adhesion to surfaces is a necesary precondition for cell growth, the technique of the invention is desirable for successful and improved tissue culture irrespective of whether the latter is performed in petri dishes, solid fibers, hollow fibers or the like.

The growth of cells can be stimulated in accordance with the invention by adding to a suspension of cells in a culture medium an amount of ionene polymer at a level below a toxic amount. The suspension of cells in the culture media is incubated to foster the desired growth. In another procedure in accordance with the invention, the surface of the cell culture device such as a petri dish is first treated with a dilute solution of an ionene polymer at a level below a toxic amount before application of a cell culture medium to the surface in order to promote adhesion and growth of cells or clusters of cells.

These and many other aspects, features and advantages of the invention will become apparent as the invention becomes better understood by reference to the following detailed description when considered in conjunction with the accompanying drawings.

DESCRIPTION OF THE PREFERRED EMBODIMENTS

Figure 1:
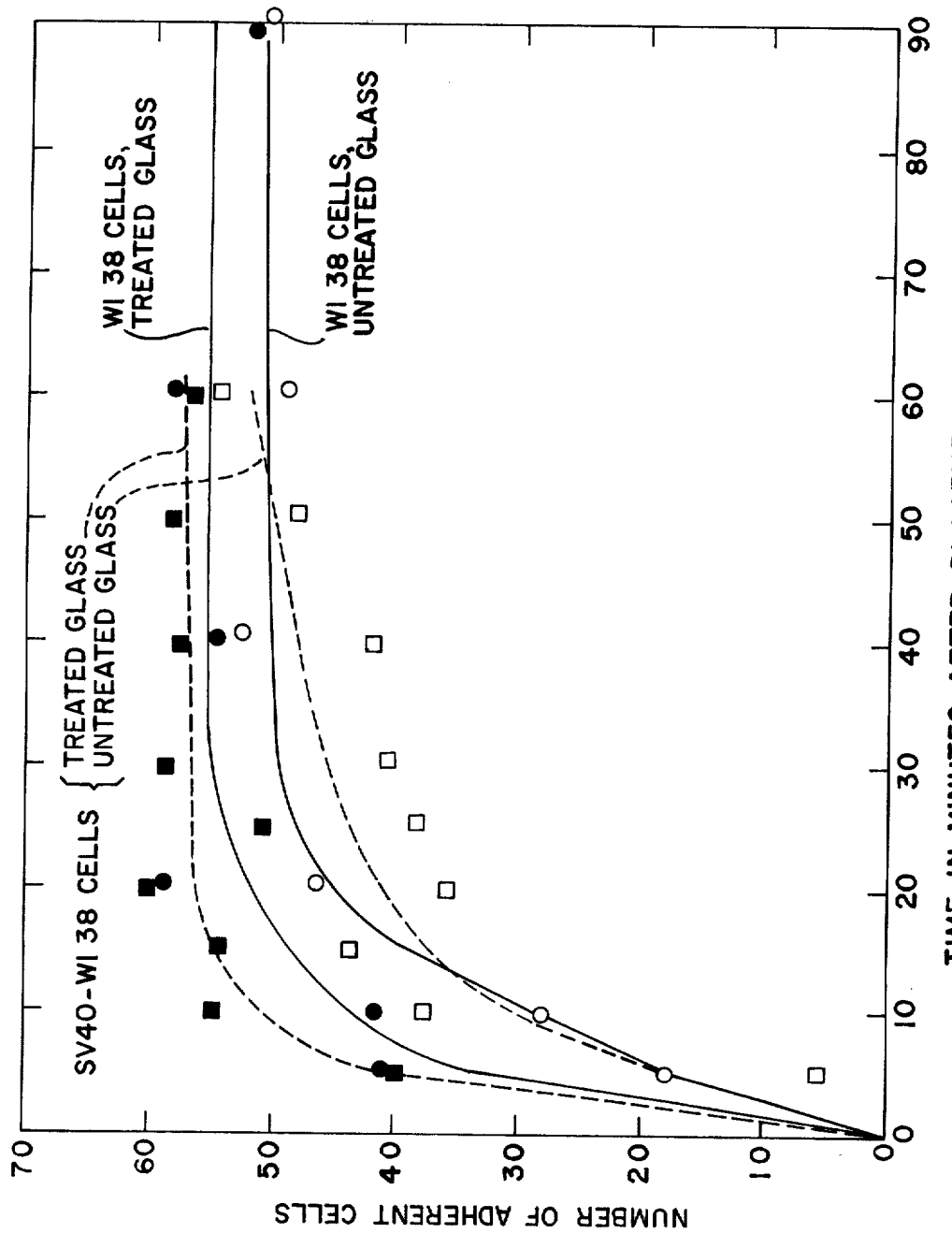
FIG. 1 is a graph demonstrating the stimulative effect of 3,3-Ionene treatment of a glass surface on the growth of WI-38 and SV-40-WI-38 cells.

The ionene polymers of interest in this invention are water-soluble, linear polymers, without cross-linking or branching. The polymers have a molecular weight from 3,000 to 100,000, generally from 10,000 to 60,000 and are solids at room temperature and have an average charge of at least one intra polymeric quaternary nitrogen for an average of every twelve chain atoms.

The ionenes have the general structure:

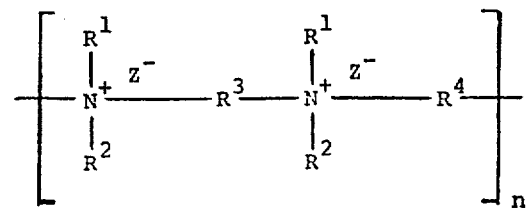

where $R^1$ and $R^2$ are methyl, $R^3$ and $R^4$ are divalent aliphatic, aromatic or heterocyclic groups containing at least 3 carbon atoms, or $R^3$ combined with $R^1$ and $R^2$ forms a cyclic group and $Z^-$ is an anion, generally chloro, bromo or iodo.

Aliphatic ionene polymers in which $R^3$ and $R^4$ are the same polymethylene group of the formula $(CH_2)_x$ where $x$ is 3 or more than 6 can be prepared by homopolymerization of tertiary amino alkyl halides of the formula

in accordance with the procedure disclosed in copending application Ser. No. 280,649, filed Aug. 14, 1972. Values of $x$ between 4 and 7 result in cyclic products.

Ionenes can also be prepared by the copolymerization of ditertiary amines and dihalo organic compounds. This reaction permits the synthesis of a variety of linear polymers in which the distance between positive nitrogen centers can be varied at will. With aliphatic ionenes of the formula:

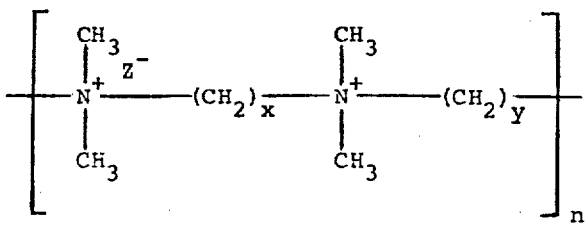

the values of $x$ and $y$ between 3 and 16 must also be selected to avoid formation of cyclic compounds, as disclosed by Rembaum et al., *Macromolecules* 5 261 (1972), the disclosure of which is incorporated herein by reference.

Well defined conditions of synthesis relating to formation of relatively high molecular weight ionenes are disclosed by Rembaum et al., *J. Polym. Sci.*, Part B 6 (1968), the disclosure of which is incorporated herein by reference. Generally, high molecular weight ionene polymers are prepared in a 0.1 to 2.5 molar solution of a ditertiary amine and a dihalo organic compound in solvent at temperatures below about 50°C. Higher polymerization rates occur in polar organic solvents such as dimethyl formamide (DMF), dimethyl sulfoxide (DMSO), methanol, preferably a mixture of DMF ad methanol.

The dihalo organic material is a compound of the formula $ZR^4Z$ where Z is chloro, bromo or iodo, where $R^4$ is a divalent organic radical such as alkylene, arylene, alkarylene or aralkylene. Hydrocarbon $R^4$ groups may also be interrupted with atoms such as nitrogen, oxygen or sulfur and may be substituted with diverse pendant groups that do not interfere with the polymerization reaction or activity of the polymer or promote undesirable side effects during use.

Representative dihalo organic compounds are α,ω-chloro or bromo terminated compounds such as 1,3-dichloropropane, 1,3-dibromopropane, 1,4-dichlorobutane, 1,4-dibromobutane, 1,4-dichloro-2-butene, 1,4-dibromo-2-butene, 1,4-dibromo-2,3-dihydroxy butane, -dibromohexane, 1,5-dichloropentane, 1,6-dibromohexane,, 1,8-dichlorohexane, 1,10-dichlorodecane, and 1,16-dichlorohexadecane. The alkenylene compounds are more reactive than the corresponding saturated compounds. Dihalo aromatic compounds such as o, m, and p-dichloro or -dibromo xylene may also be utilized.

The diamine reactant for the copolymerization reaction may be represented by the formula:

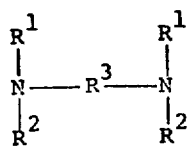

where $R^3$ is aliphatic, aromatic, heterocyclic or $R^3$ when combined with $R^1$ and $R^2$ forms a cyclic group. Representative compounds are N,N,N',N'-tetramethyl-1,3-diamino propane, N,N,N',N'-tetramethyl-1,3-hexamethylene diamine (THD) and N,N,N',N'-tetramethyl-1,10-decamethylene diamine. Examples of heterocyclic or aromatic compounds are 1,2-bis-(4-pyridyl)-ethane, -propane or -butane, dipyridyl, diazobicyclooctane or tetramethyl diamino, diphenyl methane.

The biological cells are cultured in accordance with standard practice. The cells may be cultured directly from an animal specimen such as tissue, mucous, sputum or blood or the specimen may be treated to isolate a single cell species. The cell species may be normal or transformed, e.g. malignant. The cells are dispersed in a culture medium containing a nutrient such as agar, glucose, bouillon or gelatin glucose or blood serum and then placed on the surface of a culture apparatus such as a slide, petri dish, flask, cylinder, sheet, test tube, solid fiber or inside or outside surfaces of a hollow fiber or tube. The apparatus is usually formed of a transparent material such as glass or a plastic such as polystyrene, polyethylene, polypropylene, Teflon (polytetrafluoroethylene), polyester or an acrylic resin. The apparatus is usually incubated at room temperature or elevated temperature from 25° to about 45°C for a period before removing the medium and unadhered cells by washing.

A series of experiments were conducted to demonstrate the manner in which ionene polyelectrolytes provide a superior environment for culturing cells. The nature of binding of ionene polymers and the resultant biological activity against normal and cancerous cells was tested by in vitro growth experiments. The host cells were normal epithelial human diploid fibroblast lung cells (WI-38) and its SV-40 (Simian Virus) transformed derivative WI-38 VA132RA (SV-40-WI-38). Due to the high positive charge density and high water solubility, the ionenes strongly interact with a wide variety of biological materials. Since it has been suggested that malignant cells are more electro-negative than normal cells, malignant cells should demonstrate a greater affinity for the electropositive ionene polymer.

A series of studies were carried out to evaluate the degree of cellular adherence and spreading capacity of normal and SV-40 transformed human cells (WI-38) on normal glass surfaces and on glass which was coated with ionene. In the study, mammalian cells were in culture with ionenes as molecular probes to understand the cell membrane properties. The surface of most mammalian and avian cells has a net negative charge. Several altered cell membrane characteristics are most noticeable in transformed cells. With some exceptions, the net surface negativity increases by about 20 percent in a transformed cell. This difference in the surface charge results in the differential cell-cell aggregation and also in differential cell-substratum adhesion, since the substratum-like glass also has a net negative charge. The polycation-coated glass surface would shift the surface charge in favor of positivity, accelerating the cellular adhesion. Since the transformed cells have about 20 percent more negative charge than their normal ancestors, the transformed cells may adhere and spread faster than the normal cells to polycation-coated glass surfaces. WI-38 cells of passage 17-22 and SV-40-WI-38 cells of passage 194-206 were utilized in these experiments.

EXAMPLE 1

Type WI-38 normal lung cells and this same type of cells transformed by means of SV-40 (Simian Virus) cells, were used for testing. Each group of cells was placed on a standard microscope slide cover glass which served as a substrate for cell adhesion. Prior to cell placement, two cover glasses were immersed for 30 minutes in an aqueous $CA^{++}$ and $Mg^{++}$ free Hanks solution of a 50,000 molecular weight 3,3-ionene bromide (2µg/ml) and then rinsed twice with the Hanks solution (pH 7). Two "commercial" cover glasses served as controls. A 3- to 4-day old culture was trypsinized (0.25 percent trypsin), then rinsed three times with serum-free Eagle's culture medium. A 4 milliliter sample of $5 \times 10^5$ cells in the serum-free medium (pH 7.2–7.4) was placed on each of the four cover glasses using standard laboratory techniques. The four samples were incubated at 34°C for 5 minutes, then subjected to gyratory shaking for 3 minutes at 330 rpm. Weakly attached and floating cells were decanted. Cells remaining on the cover glass were rinsed in a saline solution and fixed with a 2 percent glutaraldehyde saline solution. Each sample was examined under a microscope and the number of cells counted in eight randomly selected areas. The above procedure was then repeated a number of times with incubation periods varying from 10 to 90 minutes. The data showing the number of cells adhering to the ionene treated and to the commercial glasses after varying durations of incubation are shown plotted in FIG. 1.

From these curves it can be seen that more cells (both normal and transformed) adhere to the ionene treated glass than to the commercially available glass indicating that the strength of adhesion of cells to the substrate has increased and more adhesive sites are established.

EXAMPLE 2

Figure 2:
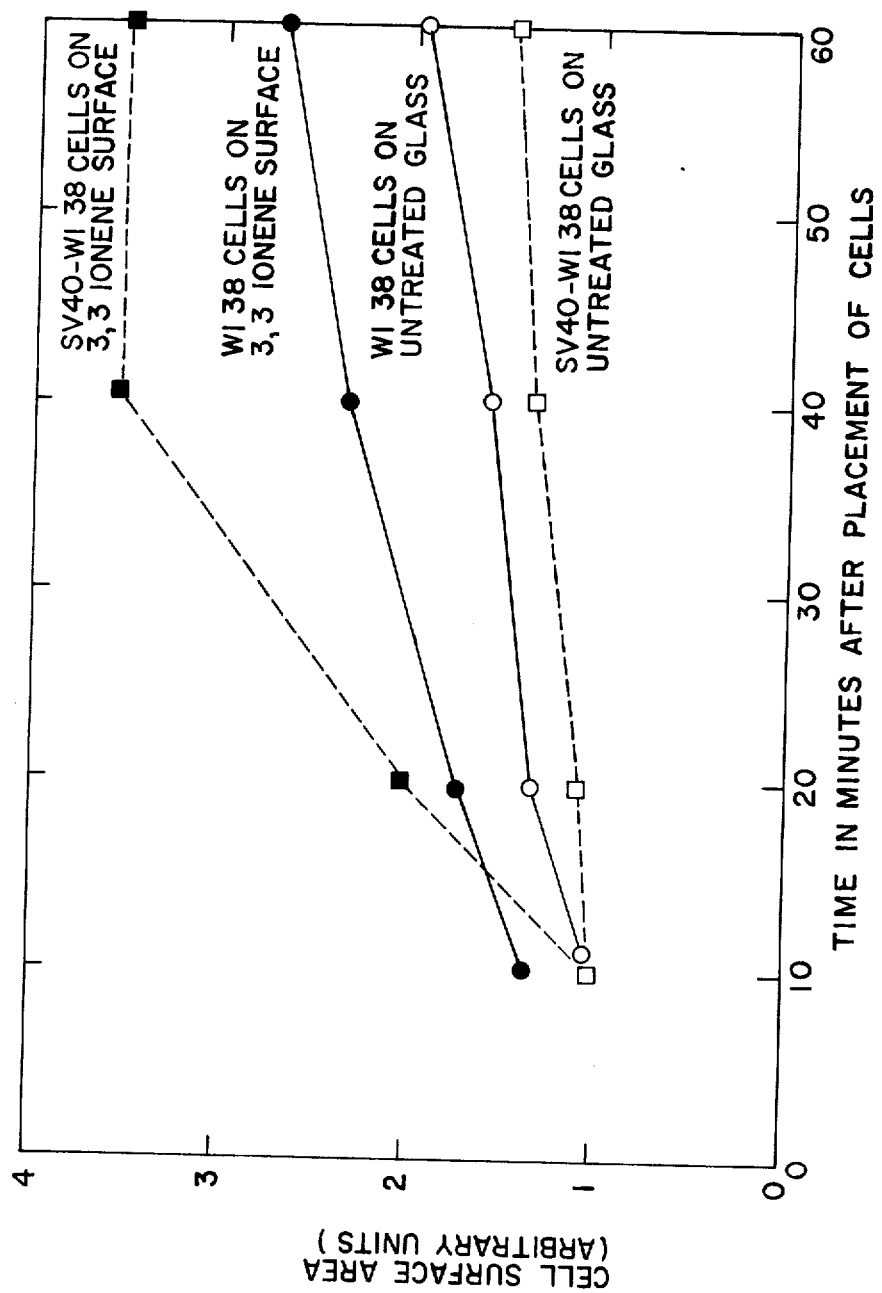
FIG. 2 is a graph showing the cell surface area on 3,3-Ionene treated and untreated glass surfaces.

The second experiment was designed to determine the rate of cell spreading or flattening (as contrasted to adhering as in Example 1). Samples of cells were placed on cover glasses in a manner identical to the procedure described in Example 1. The surface area of a number of cells was determined at regular time intervals, and the average area calculated by taking randomly selected photographs (uniform magnification) of cell samples, carefully marking the cell boundaries and cutting the photographs along the boundary and weighing a total of 30–40 cells/treatment at different times. The area of a cell on the glass is shown in arbitrary units in the following table and plotted in FIG. 2 as a function of time. This data has the limitations of light microscope resolution.

Table 1

| | Area occupied by a cell on the glass surface in arbitrary units. (Each number is an average of 30–40 cells) | | | |
|---|---|---|---|---|
| | 10 min. | 20 min. | 40 min. | 60 min. |
| WI-38 cells on untreated glass | 1.0 | 1.3 | 1.6 | 2.0 |

Table 1-Continued

| | Area occupied by a cell on the glass surface in arbitrary units. (Each number is an average of 30–40 cells) | | | |
|---|---|---|---|---|
| | 10 min. | 20 min. | 40 min. | 60 min. |
| WI-38 cells on 3,3-Ionene surface | 1.3 | 1.7 | 2.3 | 2.7 |
| SV-40-WI-38 cells on untreated glass | 1.0 | 1.1 | 1.3 | 1.4 |
| SV-40-WI-38 cells on 3,3-Ionene surface | 1.0 | 2.0 | 3.5 | 3.5 |

There is an acceleration in cell spreading in both normal and transformed WI-38 cells in the presence of 3,3-ionene coating, which is markedly pronounced in the SW-40 transformed WI-38 cells. This is compatible with the assumption that polycation coated glass surfaces have more positive charges and the high negativity of the transformed cell membrane. One experiment was conducted with SV-40 transformed 3TC cells (Balb c mouse). These also showed a marked increase in cell spreading on the polyionene treated glass surface.

EXAMPLE 3

A third experiment was performed, repeating the procedures of Examples 1 and 2, except that 6,10-ionene chloride having a molecular weight of 50,000 was used in place of 3,3-ionene. Similar results were obtained.

EXAMPLE 4

Figure 3:
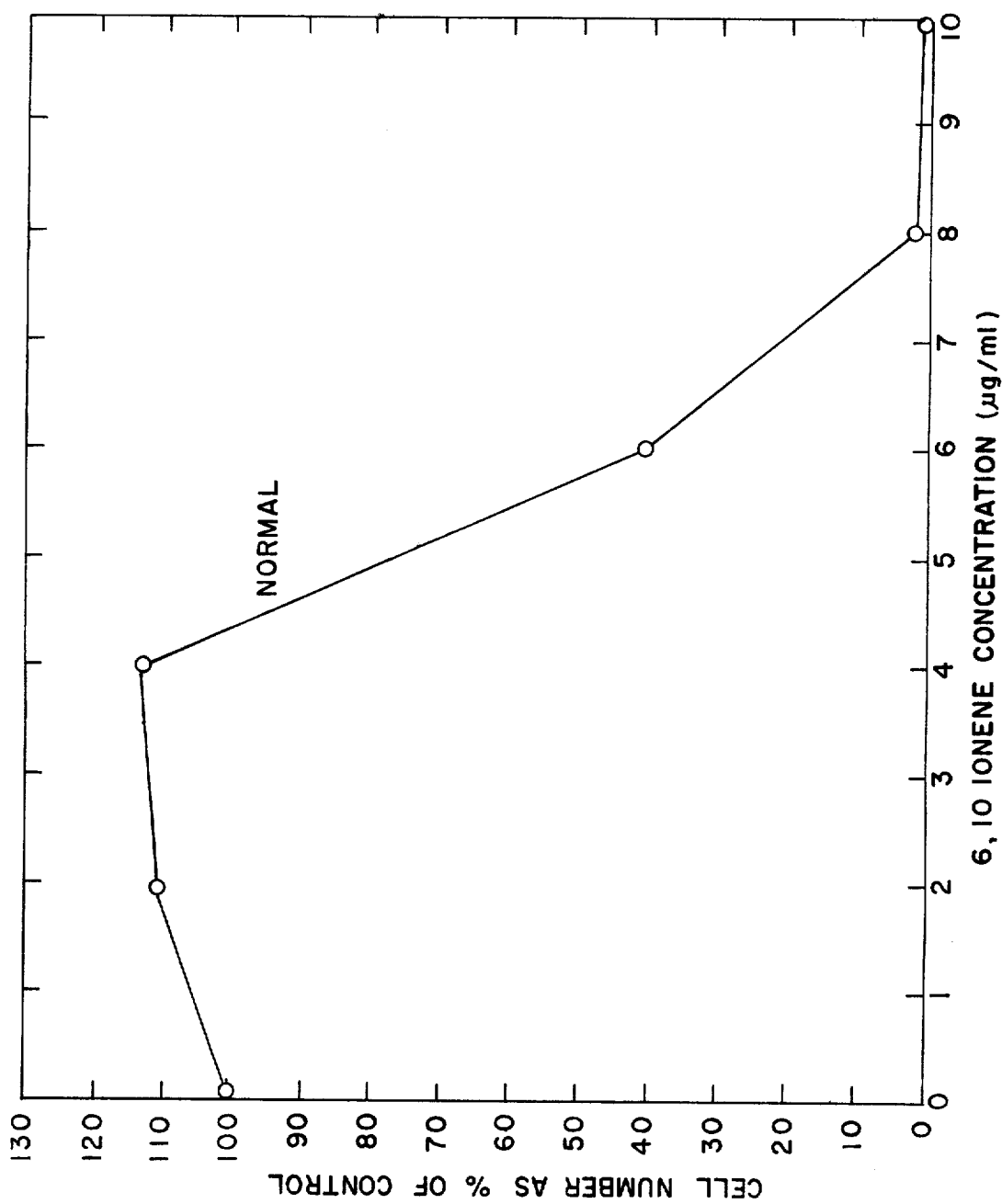
FIG. 3 is another graph showing the effect of 6,10-Ionene concentration on the growth of normal cells.

A fourth experiment attempted to determine the optimum concentration of 6,10-ionene chloride in a culture medium for promoting cell growth. Batches of culture medium with varying amounts of ionene, from 0 to 10 µg of ionene per ml of medium, were prepared. A specific number of cells was added to each mixture, then incubated for 4 days. The number of cells in each batch was then determined by resuspending the cells and counting them in a Coulter Counter, a device for automatically counting the number of cells in a liquid suspension. The results are plotted in FIG. 3. It can be seen that concentrations of the ionene of approximately 2 to 4 µg/ml cause the cells to multiply approximately 10 percent faster than the batch with no ionene, but that a concentration of 8 µg/ml is lethal. In a similar experiment, 3,3-ionene did not effectively promote growth.

EXAMPLE 5

The fifth experiment, similar to Example 2, was made utilizing rat-kangaroo epithelial cells and polystyrene containers treated with a 6,10-ionene chloride solution. Cell placement was very dilute, i.e. individual cells were widely separated from each other. Effectiveness in promoting growth was measured by counting the number of colonies and the number of cells in each colony. Both counts were found to be considerably greater on treated surfaces than on the surfaces of commercially available containers.

EXAMPLE 6

A sixth experiment, similar to Example 5 except using 3,3-ionene, did not produce a similar increase in growth.

The above experiments indicate that cell culture stimulation is dependent upon the structure of the ionene, and that 6,10-ionene is superior to 3,3-ionene for this purpose for the type of cells tested.

It appears that the lower charge distribution and pattern of repeating intramolecular charge centers in the 6,10-ionene polymer backbone provides higher stimulation to cell growth than the higher charge distribution in 3,3-ionene polymer. These studies have shown that cell adhesion and spreading on glass surface is accelerated by the presence of polycation coating and shows a differential interaction with the transformed cells due to higher electronegativity. The different degrees of ionene binding of the cells to surfaces indicates a differential adhesion toward normal and malignant cells.

Though the mechanism of ionene cell interaction is not completely understood, pretreatment of the cells with N-ethylmaleimide (NEM) inhibited cell adhesion on an ionene-coated surface and indicated the involvement of sulfhydryl groups on the cell periphery in the process of cell adhesion. Chemical interaction with DNA is also a possibility. In fact ionenes form strong water-insoluble complexes with DNA.

Glass and polystyrene surfaces were treated with aqueous solutions of 6,10-ionene chloride (4 ppm) and rinsed with distilled water 3 times. The number of WI-38 cells grown on treated surfaces was found to be greater than on control untreated surfaces (30, 8 and 6 percent greater after 18, 21 and 30 passages of cell population, respectively). This finding was corroborated by observations of increased cell spreading on ionene treated surfaces determined by scanning electron microscopy.

In addition, ionene treated surfaces showed a remarkable effect on human erythrocytes. The latter lost their normal deformability and were so strongly attached to the surface that they could not be dislodged even at very high rates of fluid flow. Evidence that a layer of ionene remains on surfaces even after repeated washings was obtained from experiments using tritium labeled polymers.

EXAMPLE 7

A concentration of approximately 0.05 $\mu g/cm^2$ of ionene was found to remain on the surface after the latter was in contact with a 10 $\mu g/ml$ solution of 6,10-ionene. Furthermore, it has been shown that static charges on dacron cloth could be practically eliminated by means of an ionene treatment. A possible explanation for the ionene effects is a change in the electrical surface properties of the surface. A residual monolayer of ionene imparts a positive charge to the normally negatively charged glass or polystyrene surface. The increased adhesion of negatively charged membranes is therefore due to electrostatic interaction between negative and positive charges. The cooperative effect of a relatively high molecular weight polymer of high charge density results in a considerably stronger ionic bond with negatively charged proteins or glass surfaces than a similar bond between monomeric compounds. Since cell adhesion to surfaces is a necessary precondition for cell growth, the described facts strongly indicate that ionene treatment of surfaces may constitute a desirable procedure for successful tissue culture irrespectively whether the latter is performed in petri dishes, solid fibers, or hollow fibers.

It is to be realized that only preferred embodiments of the invention have been described and that numerous substitutions, alterations and modifications may be made without departing from the spirit and scope of the invention as defined in the following claims.

What is claimed is:

1. A method of promoting growth of biological cells in vitro comprising the steps of:
    adding to a culture medium of the cells a minor growth promoting amount of a water-soluble, linear, ionene polyquaternary polyelectrolyte polymer having a molecular weight from 3,000 to 100,000, an average charge of at least one intrapolymeric quaternary nitrogen atom for an average of every twelve polymer chain atoms and a repeating unit of the formula:

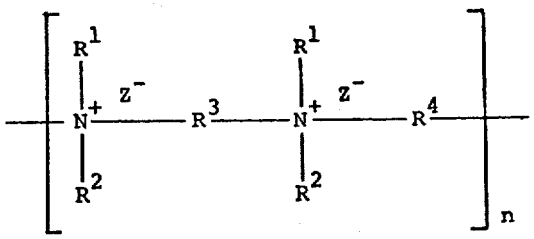

where $R^1$ and $R^2$ are lower alkyl, $R^3$ and $R^4$ are divalent groups containing from 3–16 carbon atoms selected from alkylene, alkenylene, arylene, alkarylene and aralkylene or $R^3$ combined with $R^1$ and $R^2$ forms a cyclic group, $Z^-$ is an anion and $n$ is an integer;
    culturing the cells in said medium; and
    recovering said cells.

2. A method according to claim 1 in which the medium is cultured in a container and the ionene polyelectrolyte is applied as a dilute solution to the surface of the container in contact with the medium before contact is made.

3. A method according to claim 2 in which the surface is selected from glass and plastic.

4. A method according to claim 3 in which the plastic is polystyrene.

5. A method according to claim 3 in which the concentration of ionene polymer on the surface is at least 0.01 $\mu g/cm^2$.

6. A method according to claim 1 in which the ionene polymer has a molecular weight from 10,000 to 60,000 and $Z^-$ is chloro, bromo or iodo.

7. A method according to claim 1 in which $R^3$ and $R^4$ are alkylene of 3–6 carbon atoms and $R^1$ and $R^2$ are methyl.

8. A method according to claim 7 in which $R^3$ is hexamethylene and $R^4$ is decamethylene.

9. A method according to claim 7 in which $R^3$ and $R^4$ are both propylene.

10. A method according to claim 1 in which the concentration of ionene polymer is no greater than 4 $\mu g/ml$.

11. An apparatus for culturing biological cells in which the cell contacting surface of the apparatus contains a growth promoting layer of a water-soluble, linear ionene polymer at a concentration of at least 0.01 $\mu g/cm^2$; said ionene polymer having a molecular weight from 3,000 to 100,000, an average charge of at least one intrapolymeric quaternary nitrogen atom for an average of every twelve polymer chain atoms and a repeating unit of the formula:

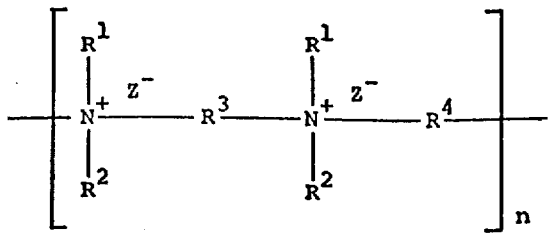

where $R^1$ and $R^2$ are lower alkyl, $R^3$ and $R^4$ are divalent groups containing from 3–16 carbon atoms selected from alkylene, alkenylene, arylene, alkarylene and aralkylene or $R^3$ combined with $R^1$ and $R^2$ forms a cyclic group, $Z^-$ is an anion and $n$ is an integer.

12. An apparatus in accordance with claim 11 in which the cell contacting surfaces are selected from glass and plastic, the ionene is a 6,10-ionene chloride and the concentration is no more than 0.1 $\mu g/cm^2$.

13. A culture medium for promoting the growth of biological cells containing up to 4 $\mu g/ml$ of a water-soluble, linear ionene polymer having a molecular weight from 3,000 to 100,000, an average charge of at least one intrapolymeric quaternary nitrogen atom for an average of every twelve polymer chain atoms and a repeating unit of the formula:

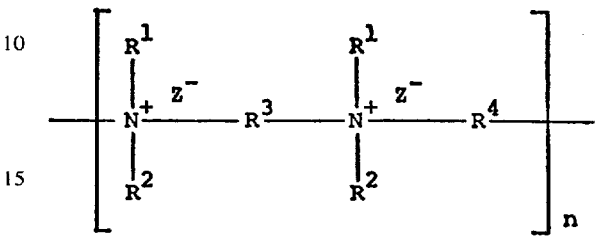

where $R^1$ and $R^2$ are lower alkyl, $R^3$ and $R^4$ are divalent groups containing from 3–16 carbon atoms selected from alkylene, alkenylene, arylene, alkarylene and aralkylene or $R^3$ combined with $R^1$ and $R^2$ forms a cyclic group, $Z^-$ is an anion and $n$ is an integer.

* * * * *